United States Patent [19]
Manheimer et al.

[11] Patent Number: 4,548,782
[45] Date of Patent: Oct. 22, 1985

[54] TOKAMAK PLASMA HEATING WITH INTENSE, PULSED ION BEAMS

[75] Inventors: Wallace M. Manheimer, Silver Spring, Md.; Niels K. Winsor, Alexandria, Va.

[73] Assignee: The United States of America as represented by the Secretary of the Navy, Washington, D.C.

[21] Appl. No.: 134,717

[22] Filed: Mar. 27, 1980

[51] Int. Cl.[4] .............................................. G21B 1/00
[52] U.S. Cl. .................................... 376/127; 376/130; 376/135; 315/111.71
[58] Field of Search ........................................ 176/3–5; 376/127–130, 135; 315/111.71, 111.61, 111.41

[56] References Cited

U.S. PATENT DOCUMENTS

| 3,047,480 | 7/1962 | Lovberg et al. | 376/133 |
| 3,749,639 | 7/1973 | Kapitza | 176/5 |
| 3,831,101 | 8/1974 | Benford et al. | 176/5 |
| 4,057,462 | 11/1977 | Jassby et al. | 176/5 |
| 4,065,351 | 12/1977 | Jassby et al. | 176/5 |
| 4,115,191 | 9/1978 | Ott et al. | 176/5 |
| 4,172,008 | 10/1979 | Fleet | 176/5 |

FOREIGN PATENT DOCUMENTS 848346 9/1960 United Kingdom .................... 176/5

OTHER PUBLICATIONS

Nuclear Fushion (17) 2 (1977), pp. 309, 321–323, 329–331, 361, Jassby.
IAEA-CN-33/A-4-1, vol. 1 (11/74), pp. 77–81, Bol et al.
Conf-760733, pp. 81–86, Jassby et al. (III) Counter-streaming Low-Tokamak Fissile Breeder.
Controlled Nuclear Fusion: Current Research and Potential Progress, National Academy of Sciences, Wash., D.C. (1978), pp. 9, 33–36.

Primary Examiner—Salvatore Cangialosi
Attorney, Agent, or Firm—Robert F. Beers; William T. Ellis; Alan P. Klein

[57] ABSTRACT

An intense, space-charge-neutralized, pulsed ion beam is used to heat a magnetically-confined plasma, such as tokamak plasma, by injecting the ion beam into the plasma along a trajectory that is generally tangential to the confining magnetic field. The intense ion beam is injected into the tokamak before the plasma is fully formed, the remainder of the plasma is formed around the beam, and the beam transfers its energy to the plasma by classical collisions with the electrons and ions of the plasma. Heating of the plasma can be sufficient to produce breakeven or ignition.

8 Claims, 7 Drawing Figures

TOKAMAK PLASMA HEATING WITH INTENSE, PULSED ION BEAMS

BACKGROUND OF THE INVENTION

This invention relates in general to methods and apparatus for transferring energy to a magnetically confined plasma. More particularly, this invention relates to a method and apparatus for heating a tokamak-confined plasma to thermonuclear temperatures by injecting an intense, pulsed, space-charge-neutralized ion beam into the plasma.

Various techniques of heating tokamak-confined plasma have been proposed in controlled thermonuclear fusion research in an effort to provide an ionized gaseous plasma of sufficient density and temperature to sustain fusion reactions. Heretofore such reactor conditions have not been attained because insufficient heating, plasma-confinement instabilities, and energy-loss mechanisms prevent the plasma from reaching the required temperatures.

It is generally agreed that ohmic heating by the main plasma current is ineffective near reactor temperatures because the plasma resistivity is a sharply decreasing function of temperature. Present-day experiments show that chemically heated tokamaks fall for short of reactor temperatures.

Since ohmic heating is insufficient, supplementary heating is required and techniques such as heating with neutral beams, microwave power and intense electron beams have been proposed. It is necessary that the power produced by these supplementary techniques be deposited near the center of the reactor plasma so that the energy is confined in the plasma and does not escape out of the plasma to the walls of the tokamak, thus introducing impurities from the wall into the system. These impurities, at best, cause inefficient heating—they may even result in the cooling of the confined plasma.

The injection of neutral beams into the confining magnetic field is recently regarded as the most promising method of supplementary heating. However, neutral beams can only be efficiently produced for energies less than 160 keV for deuterons (80 keV for protons). Considerably larger energies are needed if the neutral beam is to be deposited near the center of the reactor plasma. Microwave power can be delivered to the tokamak by waveguides attached to openings in the side walls, or by large coil structures inside the main vacuum chamber. This approach is limited by difficulty in controlling where in the plasma the microwave power is deposited, and also by anomalous scattering or anomalous absorption of the microwave power in the outer regions of the plasma due to parametric instabilities.

The injection of intense pulsed electron beams is a possible means of heating tokamak plasmas. However, the time required for relativistic electrons to deposit their energy into a plasma is very long so that some anomalous stopping of the beam must be invoked. This is very speculative and, even if there is an anomalous stopping, there may also be associated energy loss from the plasma. For instance, experiments have shown that discharges with runaway electrons can be very destructive to tokamak liners.

In ohmic heating, heating with neutral beams and heating with microwave power, the tokamak current is driven, i.e., the plasma is the secondary of a transformer whose flux runs through the center of the tokamak. This current-control system represents a very large part of the cost and complexity of a tokamak.

SUMMARY OF THE INVENTION

The present invention provides for heating a reactor plasma by the injection of an intense, pulsed ion beam into the plasma. The present invention has the advantage that ion beams can be produced efficiently over a wide range of voltages and currents. Ion beams are characterized by enormous power and very short delivery time. In the present invention, the ion beam is first injected nearly tangent to the field and then the plasma column is built around it. Heating of the plasma electrons and ions by classical collisions with the ion beam can be sufficient to produce ignition.

In a first embodiment, a full density plasma is produced only in the center of the tokamak, the beam is shot into the target plasma, and then when the beam is trapped in the center, the remaining plasma is built up around it by gas puffing. The initial target plasma must carry the full tokamak current. However, once the ion beam is injected, it maintains the current, even long after it has lost its energy. Thus, the plasma-current-production system can be reduced in cost and complexity.

In a second embodiment, a low-density plasma is produced and fills the tokamak. The beam is then shot into the plasma and generates current and poloidal field, causing it to be trapped in the center, after which the remaining plasma is built up around it by gas puffing. The ion beam provides the full tokamak current which persists long after the beam has lost its energy, so that the plasma current system can be completely eliminated.

Additional advantages and features will become apparent as the subject invention becomes better understood by reference to the following detailed description when considered in conjunction with the accompanying drawings wherein:

DESCRIPTION OF THE PREFERRED EMBODIMENT

In the present invention, an intense, space-charge-neutralized, pulsed ion beam is utilized to heat a tokamak plasma. The term "space-charge-neutralized" is used herein to indicate that the intense ion beam contains an equal number of ions and electrons (although the electrons may be of much lower energy than the ions) so that the ion beam used in the present invention may be thought of as an intense, neutral, plasma beam. The intense ion beam is injected into the tokamak before the plasma is fully formed, the remainder of the plasma is formed around the beam, and the beam transfers its energy to the plasma by inelastic collisions with the electrons and ions of the plasma.

Figure 1:
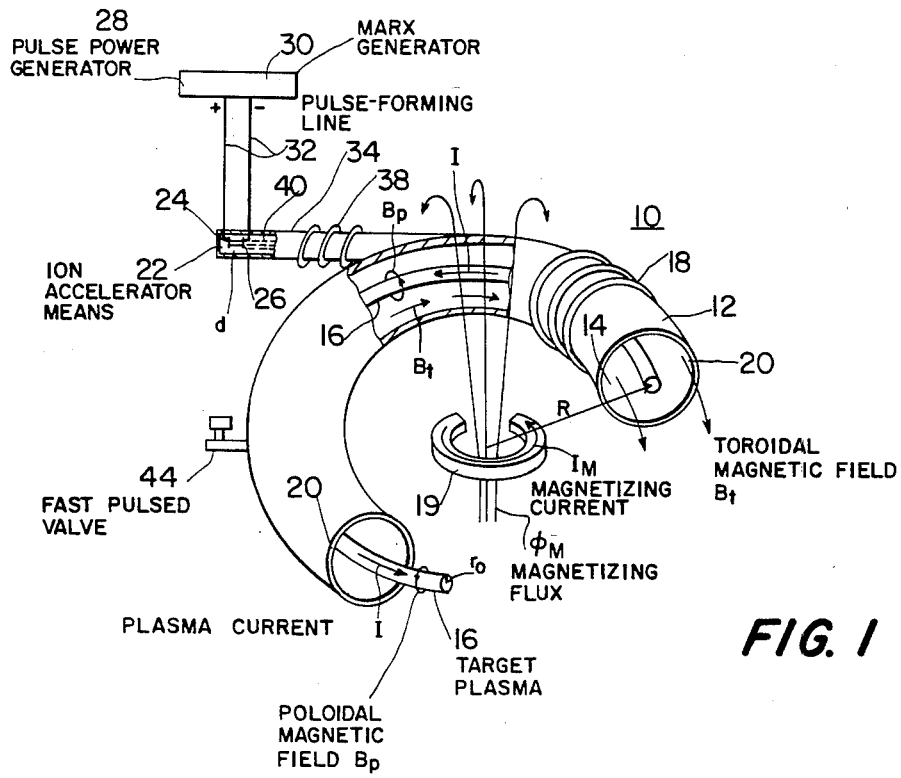
FIG. 1 is an isometric, partially cut-away, view of a typical tokamak magnetic field apparatus showing the ion-beam injection system in accordance with a first embodiment of the present invention.

Referring now to the drawings wherein like reference characters refer to like or corresponding parts throughout the several views and, more particularly to FIG. 1, there is illustrate a first embodiment of the apparatus for heating a tokamak-confined plasma to thermonuclear temperatures. A basic tokamak magnetic field apparatus 10 includes a toroidal shell 12 defining an endless chamber 14. The chamber 14 is evacuated to a high vacuum and a high-density, low-volume plasma 16 (hereinafter also referred to as the target plasma) is established in the chamber by means not shown. The target plasma 16 of major radius R and minor radius $r_o$ is confined within the shell 12 in a helical magnetic field B created by the superposition of a strong, externally generated toroidal field $B_t$ and a poloidal field $B_p$ generated by the plasma current I. (The characters B, $B_t$ and $B_p$ are used herein to denote the vector magnetic fields). A toroidal winding 18, energized by a direct-current voltage source, not shown, establishes the toroidal (longitudinal) magnetic field $B_t$ while the plasma current I is induced by transformer action (the plasma acts as a transformer secondary winding) produced by primary windings 19 magnetically linked to the toroidal shell 12. A vacuum region 20 surrounds the plasma 16 in the chamber 14. Although the plasma current has the basic function of providing the rotational transform needed for plasma equilibrium, it has the incidental benefit of ohmically heating the target plasma to temperatures on the order of 1 keV. However, since much higher temperatures are required to sustain a thermonuclear reaction (approximately 10 keV in the case of a T, D type reaction), additional heating of the target plasma is required.

In order to heat the target plasma by injecting a space-charge-neutralized, pulsed ion beam into the target plasma, five things must be accomplished: first, an ion beam having the required characteristics (these characteristics will be explained hereinafter) must be produced; second, the ion beam must propagate to the tokamak and must propagate across the magnetic field in the vacuum region of the tokamak; third, the ion beam must be trapped by the target plasma; fourth, the remainder of the plasma must be formed around the beam and target plasma; and fifth, the beam must transfer its energy to the plasma in a time of the order of, or less than, the plasma's energy containment time.

Considering first the production of an ion beam having the proper characteristics, in general an electron beam and an ion beam may be generated in an ion accelerator which includes an anode and a cathode separated by an anode-cathode gap and in which the anode and cathode are capable of emitting ions and electrons, respectively. Until recently, the ratio of power delivered to the ion beam to the power delivered to the electron beam was low; however, advances in ion accelerators have greatly increased the portion of the energy delivered to the anode-cathode gap which goes to producing the ion beam.

Referring still to FIG. 1, the first embodiment of the present invention includes a pulsed ion-accelerator means 22 of the type capable of producing an intense, space-charge-neutralized ion beam. A reflex triode, reflex tetrode, a pinched electron diode or magnetically insulated diode is suitable for use as ion-accelerator means 22. Typically, ion-accelerator means 22 will include an anode 24 and a cathode 26 separated by an anode-cathode gap d. The ion-accelerator means 22 is energized by a pulsed power generator 28 which typically includes a capacitor bank connected in the form of a conventional Marx generator or pulse transformer 30 and a conventional pulse-forming line 32. Marx generator 30 provides the high voltage necessary to generate the intense ion beam and pulse-forming line 32 provides rapid delivery of the energy to the ion-accelerator means 22. Ion-accelerator means 22 and pulsed power generator 28 are well known in the art and are disclosed in U.S. Pat. No. 4,115,191 hereby incorporated by reference.

The ion-accelerator means 22 is situated in a guide tube 34 which leads to an opening 36 (see FIG. 2) in a side wall of the tokamak shell 12. The guide tube 34 is attached nearly tangent to the side wall. The ion accelerator means 22 and the guide tube 34 are subjected to a longitudinal magnetic field $B_G$ generated by guide tube winding 38 (energized by a direct-current supply not shown).

The operation of the ion-accelerator means 22 will now be briefly described. Upon being energized by the pulsed-power generator 30, an ion current is drawn from anode 24 and passes through the cathode 26. The ion accelerator means 22 is designed so that the ion beam-to-electron beam current ratio is enhanced by preventing the generation of electron current. The ion beam, represented by dashed lines 40, emerging from the cathode 26 is neutralized by electrons dragged off plasma which has been formed on the outside surface of the cathode. In the case of an ion accelerator having a planar anode-cathode gap d (in centimeters) with an applied voltage V (in megavolts), according to the Langmuir-Child law, the ion-current density produced (in amperes/cm$^2$) is $$j_{LC} = \frac{(1.85)(4)}{9} \epsilon_o \left(\frac{2e}{M}\right)^{\frac{1}{2}} \frac{V^{3/2}}{d^2} \tag{1}$$

or $$j_{LC} = 60 \frac{V^{3/2}}{d^2}$$

where
$\epsilon_o$ is the permittivity of free space,
M is the mass of a proton (in MKS units), and
e is the charge of a proton (in MKS units),
if it is assumed that no electrons are present in the gap. In fact, the presence of electrons in the gap d allows the possibility that the space-charge-limited ion current can be enhanced by a factor a ($a=j_i/j_{LC}$, where j is the actual current density). For example, reflex triode operation with enhancement factors of approximately 100 has been observed.

Figure 2:
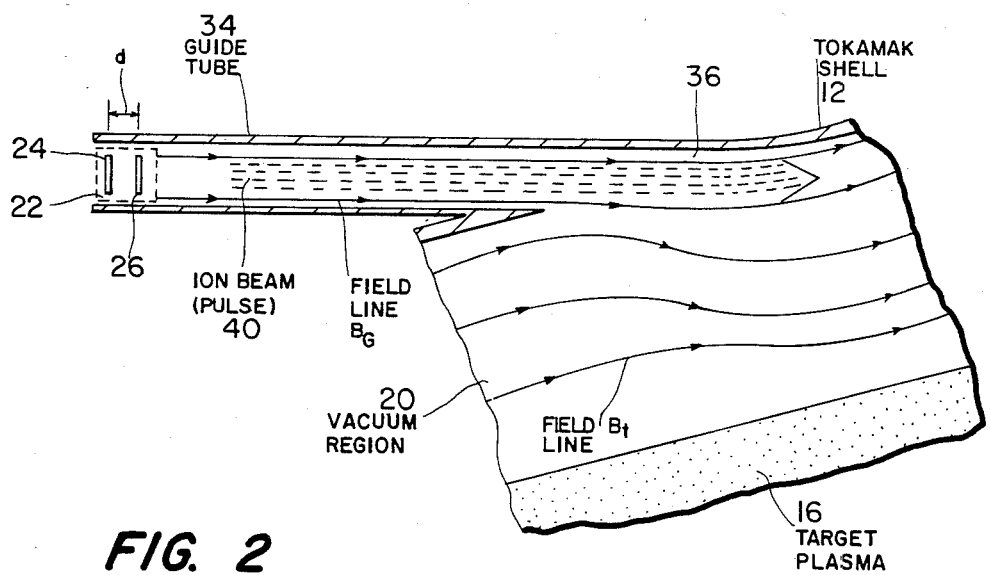
FIG. 2 is a cut-away elevation view illustrating the magnetic field lines in the guide tube and the tokamak of FIG. 1.

Considering now the injection of the space-charge-neutralized ion beam 40 into the tokomak 10, reference is made to FIG. 2. The pulsed ion-accelerator means 22, such as a reflex triode, is shown situated in the guide tube 34 which leads to the opening 36 in the side wall of the tokamak shell 21. The ion beam 40 emerging from the anode 24 and passing through the cathode 26 (neutralized as previously indicated by dragging electrons from the cathode) will propagate down the guide tube 34. At the end of the guide tube 34, the magnetic field in the guide tube $B_G$ (as generated by guide tube winding 38) merges with the tokamak magnetic field B. The ion beam 40 propagating through the guide tube 36 into the tokamak enters the tokamak nearly tangential to the field lines. The ion beam 40 must propagate across the vacuum magnetic field region 20 to reach the target plasma.

Figure 3:
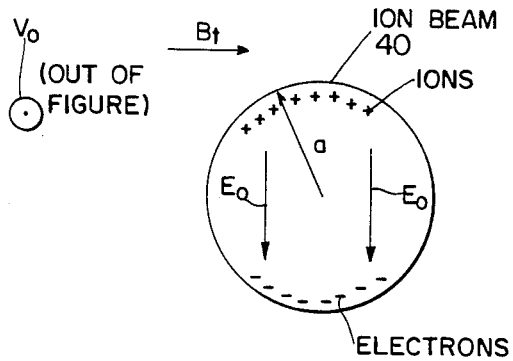
FIG. 3 shows a cross-section of the ion beam, illustrating charge separation in the beam in the vacuum region of the tokamak of FIG. 1.

As is well known, a neutralized group of ions and electrons can move across a vacuum magnetic field essentially unimpeded, if $\omega_{pi}^2 >> \Omega_i^2$, where $\omega_{pi}$ and $\Omega_i$ are the ion plasma frequency and gyrofrequency of the ion beam 40, respectively. In MKS units, $\omega_{pi}^2 = ne^2/\epsilon_o M$ and $\Omega_i^2 = eB/M$, where e is the proton charge, M is the proton mass, B is the magnetic field strength, $\epsilon_o$ is the permittivity of free space, and n is the beam density. As illustrated in FIG. 3 which shows a cross-section of the beam 40 within the vacuum region 20 (as viewed from the tokamk toward the guide tube 34), for $\omega_{pi}^2 >> \Omega_i^2$ charge separation within the beam due to adiabatic guiding center inertial drifts will set up a polarization field in the beam $$E_o = -V_o \times B$$

where $V_o$ is the beam velocity in the guide tube.

In order for the foregoing relationships to be valid, the beam density n must be sufficiently large that $\omega_{pi}^2 >> \Omega_i^2$. From the Langmuir-Child law the beam density is $$n = j_{LC}/eV_o \tag{2}$$

where
  $j_{LC}$ is the ion current density, and
  e is the proton charge.

Substituting for the ion current density $j_{LC}$ from equation (1) and substituting $\sqrt{2eV \cdot M}$ for the beam velocity $V_o$ gives a beam density $$n \approx (3 \times 10^{11}) \alpha V/d^2 (cm^{-3})$$

where V (the applied voltage) is in megavolts and d (the anode-cathode gap) is in centimeters and the enhancement factor $\alpha$ has been included.

It will be apparent to persons skilled in the art that n can be increased by converging the magnetic field $B_G$ in the guide tube 34. As will be evident from the example treated hereinafter, the condition $\omega_{pi\ hu\ 2} >> \Omega_i^2$ can easily be achieved. It is further noted that if the ions emerging from ion accelerator means 22 are not space-charge-neutralized by the addition of electrons, they will only propagate (in the vacuum region 20) a distance on the order of their Larmor radius, a distance too short to be of interest in this application.

As was shown above, when the ion beam 40 passes from the guide tube 34 into the tokamak 10 a polarization electric field $E_o$ is set up which gives the E×B drift necessary for propagation.

Figure 4:
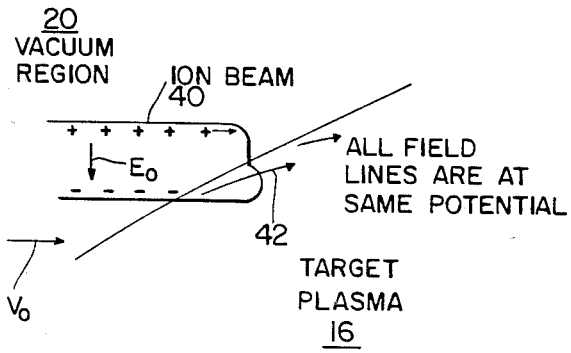
FIG. 4 illustrates the ion beam striking the target plasma.

After the beam 40 has propagated from the wall through the vacuum region 20, it must be trapped by the target plasma. Considering the trapping of the ion beam by the target plasma, reference is made to FIG. 4 which shows the beam 40 striking the plasma 16. Each magnetic field line in the beam 40 must be at a different potential in order to maintain the polarization field $E_o$ which converts the beam. However, the potential of the target plasma 16 is the same on different field lines because the plasma is a good conductor. Therefore the target plasma short-circuits the polarization field $E_o$ and traps the beam at the outside of the plasma. The trapped beam travels around the chamber 14 on the surface of the target plasma.

After the beam 40 has been trapped by the target plasma, the remainder of the plasma must be formed around the beam and target plasma, and the beam must transfer its energy to the plasma. Considering first the formation of the remainder of the plasma around the beam and target plasma, reference is made to FIG. 1. A fast pulsed valve 44 is shown situated in the side wall of the tokamak shell 12. The volume of the plasma is increased by injecting a puff of gas into the chamber 14 with the fast pulsed valve 44. The injected puff of gas produces a cold gas blanket around the target plasma and the beam which is ionized either by the target plasma and the beam, or by some other means (e.g., radio-frequency breakdown) and thereby increases the volume of plasma to its final value. The technique of "fast gas puffing" is well known in the art and is described, for example, in "High Density and Collisional Plasma Regimes in the Alcator Program" by E. Apgar et al., Plasma Physics and Controlled Nuclear Fusion Research, 1976, Vol. 1 (1976), hereby incorporated by reference.

Considering now the transfer of energy by the beam to the plasma, after formation of the remainder of the plasma around the beam and the target plasma, the transformer which drove the initial target plasma current is shut down (i.e., the magnetizing current in the primary windings 19 ceases) and the total tokamak current necessary for creation of the poloidal magnetic field is now carried in the ion beam 40. As the ion beam slows down, it heats the electrons and ions by classical collisions. The total current does not decrease as fast as the beam current does, because of the inductance of the system. When the beam has finally lost all of its energy, the plasma is heated to a sufficiently high temperature that the tokamak current decays very slowly.

Figure 5:
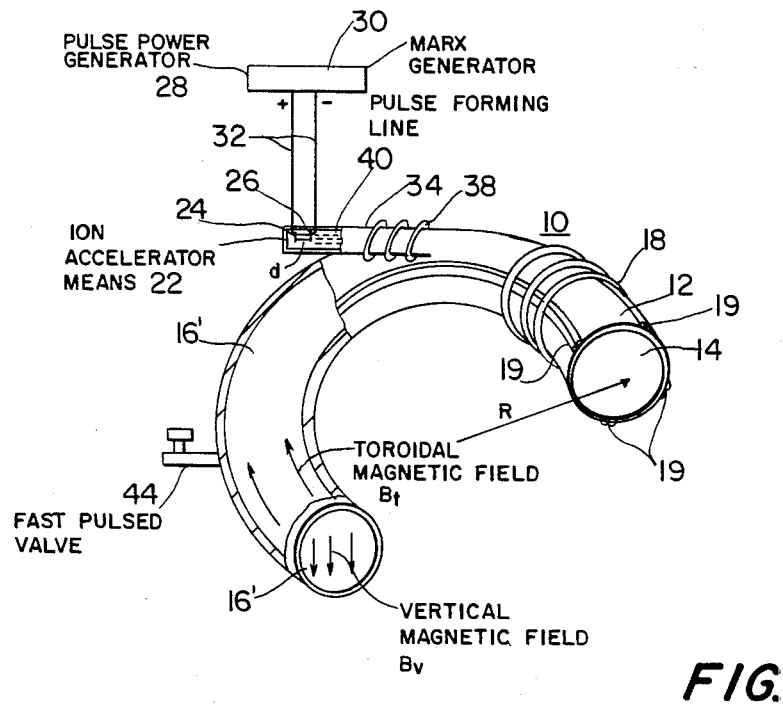
FIG. 5 is an isometric partially cut-away view of a typical tokamak magnetic field apparatus showing the ion beam injection system in accordance with the second embodiment of the present invention.

Referring to FIG. 5, there is illustrated a second embodiment of the apparatus for heating a tokamak-confined plasma to thermonuclear temperatures. A basic tokamak magnetic field apparatus 10 includes a toroidal shell 12 defining an endless chamber 14. The chamber 14 is evacuated to a high vacuum, and a low density (larger than the ion beam density) high-volume plasma 16 (hereafter also referred to as the tokamak plasma) is established in the chamber by means not shown. The tokamak plasma 16' of major radius R and minor radius equal to the radius of the shell 12, is confined within the shell in a magnetic field B created by the superposition of a strong, externally generated toroidal field $B_t$ and a much smaller vertical field $B_v$ parallel to the axis of the shell 12. (The characters B, $B_t$ and $B_v$ are used herein to devote the vector magnetic fields). A toroidal winding 18, energized by a direct current source, not shown, establishes the toroidal (longitudinal) magnetic field $B_t$, while longitudinal coils 19, also energized by a direct current source, not shown, establish the vertical magnetic-field $B_v$. No plasma current is carried by the tokamak plasma.

In order to heat the tokamak plasma by injecting a space-charge-neutralized, pulsed ion beam into the target plasma, five things must be accomplished: first, an ion beam having the required characteristics must be produced; second, the ion beam must propagate to the tokamak, third, the ion beam must be trapped by the tokamak plasma; fourth, the remainder of the plasma must be formed around the beam, and fifth, the beam must transfer its energy to the plasma in a time comparable to, or less than, the plasma energy containment time.

Considering first the production of an ion beam having the proper characteristics, reference is made to FIG. 5. The second embodiment of the present invention includes a pulsed ion-accelerator means 22 as described hereinabove of the type capable of producing an intense, space-charge-neutralized ion beam. Typically, ion accelerator means 22 will include an anode 24 and a cathode 26 separated by an anode-cathode gap d. The ion accelerator means 22 is energized by a pulsed power generator 28 which typically includes a capacitor bank connected in the form of a conventional Marx generator or pulse transformer 30 and a conventional pulse-forming line 32. Marx generator 30 provides the high voltage necessary to generate the intense ion beam and pulse-forming line 32 provides rapid delivery of the energy to ion-accelerator means 22.

The ion accelerator means 22 is situated in a guide tube 34 which leads to an opening 36 (FIG. 6) in the top wall of the tokamak shell 12. The guide tube is attached nearly tangent to the top wall. The ion accelerator means 22 and the guide tube 34 are subjected to a longitudinal magnetic field $B_G$ generated by guide tube windings 38 (energized by a direct current supply not shown).

Figure 6:
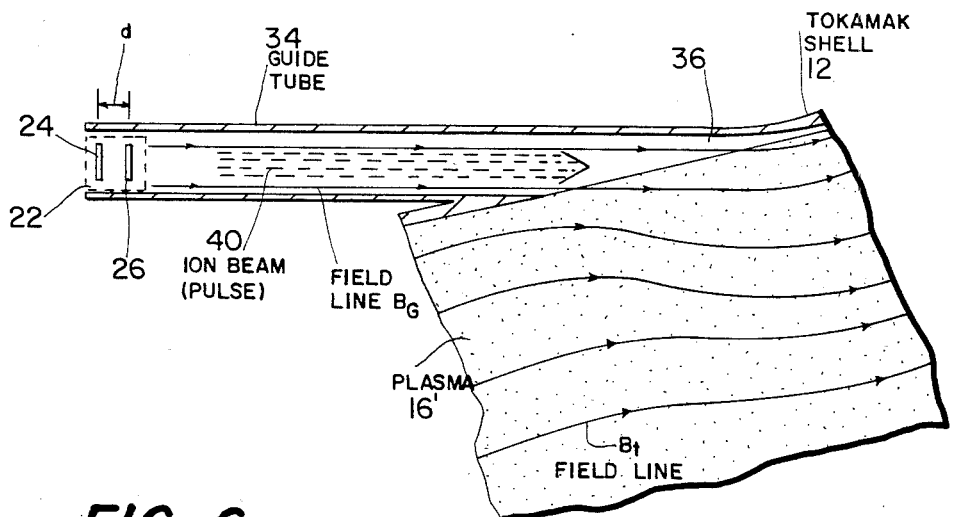
FIG. 6 is a cut-away elevation view illustrating the magnetic field lines in the guide tube and the tokamak of FIG. 5.

Considering now the injection of the space-charge-neutralized ion beam 40 into the tokamak 10, reference is made to FIG. 6. The pulsed ion-accelerator means 22, such as a reflex triode, is shown situated in the guide tube 34 which leads to the opening in the top wall of the tokamak shell 12. If the vacuum requirements for the ion source and tokamak are different, a thin foil transparent to the beam can be placed somewhere in the guide tube or else at the opening between guide tube and tokamak. The ion beam 40 emerging from the anode 24 and passing through the cathode 26 (neutralized by dragging electrons from the cathode) will propagate down the guide tube 34. At the end of the guide tube 34, the magnetic field in the guide tube $B_G$ (as generated by guide tube winding 38) merges with the tokamak magnetic field B. The ion beam 40 propagating through the guide tube 36 into the tokamak enters the tokamak nearly tangential to the field lines.

Figure 7:
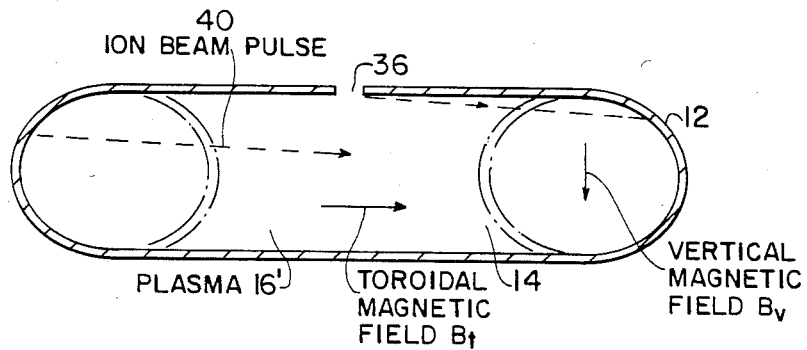
FIG. 7 is a cross-sectional view of the tokamak of FIG. 5.

After the beam 40 has entered the tokamak it must be trapped by the tokamak plasma 16'. Considering the trapping of the ion beam by the tokamak plasma, reference is made to FIG. 7 which shows the ion beam 40 entering the chamber 14 nearly tangential to the toroidal magnetic field lines. When the ion beam 40 passes into the tokamak 10, the ion beam current inductively generates an equal and oppositely directed plasma current so that no net current is produced in the tokamak. Since there is no tokamak current, the ion beam responds only to the toroidal magnetic field $B_t$ and the vertical magnetic field $B_v$. The beam ions will have a large velocity component $v_\parallel$ parallel to the toroidal field $B_t$, and a slow downward drift velocity component $v_\perp$ parallel to the vertical field $B_v$ whose magnitude is given by $$v_\perp \approx v_\parallel \left( \frac{B_v}{B_t} + \frac{v_\parallel}{R\Omega_i} \right)$$

The plasma current decays rapidly because at low density and high current there is a large anomalous resistivity (Lampe, Manheimer, McBride and Orens, Phys. Fluids 15, 2356 (1972)), whereas the ion beam current decays slowly by classical collisions of beam ions with plasma electrons. The condition for anomalous resistivity is given approximately by $$v_o > \sqrt{\frac{T_e}{m}} \left[ \sqrt{\frac{m}{M}} + \left(\frac{T_e}{T_i}\right)^{3/2} \exp -\left(\frac{T_e}{2T_i} + \frac{3}{2}\right) \right]$$

where $v_o$ is the electron drift velocity, m and M are respectively the electron and ion masses, and $T_e$ and $T_i$ are respectively the electron and ion temperatures. If there is anomalous resistivity, the electron-ion collision frequency is given approximately by $\omega pe/1000$ where $\omega pe$ is the electron plasma frequency. Thus, as the beam ions drift downward, a net tokamak current necessary for creation of the poloidal magnetic field is generated. The pinch forces on the ion beam can stop the downward drift and trap the beam on a given magnetic field surface when the net tokamak current $$I > \frac{ac B_t}{2} \left( \frac{B_v}{B_t} + \frac{v_\parallel}{R\Omega_i} \right)$$

where
 a is the radius of the ion beam, and
 c is the speed of light.

By varying $B_v$ and the density of the tokamak plasma, it is possible to optimize this process. (Varying the plasma density varies the rate at which the plasma current decays).

After the beam 40 has been trapped by the tokamak plasma, the remainder of the plasma must be formed around the beam so that the beam can transfer its energy to the plasma. Considering first the formation of the remainder of the plasma around the beam, reference is made to FIG. 5. A fast pulsed valve 44 is shown situated in the side wall of the tokamak shell 12. The density of the plasma is increased by injecting a puff of gas into the chamber 14 with the fast pulsed valve. The injected puff of gas permeates the plasma and is ionized either by the plasma and the beam, or by some other means (e.g., radio-frequency breakdown) and thereby increases the density of the plasma to its final value.

Considering now the transfer of energy by the beam to the plasma, after formation of the remainder of the plasma around the ion beam, total tokamak current is carried by the ion beam 40. As the ion beam slows down, it heats the electrons and ions by classical collisions. The total current does not decrease as fast as the beam current does, because of the inductance of the system. When the beam has finally lost all of its energy, the plasma is heated to a sufficiently high temperature that the current decays very slowly.

Reference is made to "The Transient Tokamak", Naval Research Laboratory Memorandum Report 4142 (December 1979) by the present inventors wherein it is shown that for high field, high density plasma, a single pulse of ion beam energy (about 1 megajoule) is sufficient to reach ignition. Specifically, numerical solutions for the Alcator C device at MIT are shown in FIG. 1 therein. It is assumed that the fully-formed plasma minor radius $r=10$ cm, the major radius $R=60$ cm, the plasma density $n=10^{15}$ cm$^{-3}$ and $B=160$ KG. A 5 megavolt, 1.5 megamp., 200 nanosecond tritium beam (of energy $E=1.5$ megajoules) shot into a deuterium-tritium plasma causes the plasma to ignite and, after the numerical integration stops at $t=1$ second, the energy multiplication factor (ratio of the output power derived from the fusion reaction to the input power required to heat the plasma) Q exceeds 12.

The ion beam heating approach has several advantages over ohmic heating. Chiefly, there is the enormous power of the beam. The 1.5 megajoules of beam energy is deposited in about 100 milliseconds representing an initial power dissipation of 15 Megawatts. Secondly, before the beam slows down, it deposits the last bit of its energy into the plasma. In this case, it leads to an ion temperature increase of about 2 keV and this final boost leads directly to ignition.

Also, additional calculations show that for Alcator C, a derated beam ($V=2$ Mev $I=1$ Meg Amp) and derated field ($B\approx 80$ KG) can give rise to $Q\approx 1$. Furthermore, ion beam heating can also give rise to breakeven on large volume tokamaks.

Although the present invention has been described with application to the heating of a tokamak-confined plasma, those skilled in the art will recognize that the present invention can be used with other fusion schemes in which a plasma is confined in a magnetic field, specifically, linear plasma-confining magnetic field devices (magnetic mirrors) or other toroidal confining devices such as tormak or surmac.

It is obvious that many modifications and variations of the present invention are possible in light of the above teachings. It is therefore to be understood that within the scope of the appended claims the invention may be practiced otherwise than as described.

What is claimed as new and desired to be secured by Letters Patent of the United States is:

1. Apparatus for heating a plasma, the plasma being confined in an apparatus of the type wherein the plasma is confined in a vacuum chamber by a magnetic field, comprising:
   means for producing a space-charge-neutralized, pulsed, ion beam;
   means for directing the ion beam into the magnetic field before the plasma is fully formed; and
   means for forming the remainder of the plasma around the beam,
   the beam transferring its energy to the plasma by classical collisions with the electrons and ions of the plasma.

2. The apparatus recited in claim 1, wherein the ion beam is directed into the magnetic field along a trajectory generally tangential to the lines of force of the magnetic field.

3. The apparatus recited in claim 1, wherein a vacuum region is formed surrounding the plasma; and the ion frequency of the beam is very much larger than the square of the gyrofrequency of the beam in the magnetic field, thereby producing a polarization electric field in the beam when it enters the magnetic field, the polarization field enabling the beam to propagate across the vacuum region.

4. The apparatus recited in claim 1 wherein the plasma-forming means includes:
   fast pulsed valve means for injecting a puff of gas into the vacuum chamber.

5. A method for heating a plasma confined in a magnetic field in a vacuum chamber comprising the steps of:
   (a) producing a space-charge-neutralized pulsed ion beam;
   (b) injecting the beam into the magnetic field before the plasma is fully formed; and
   (c) forming the remainder of the plasma around the beam,
   the beam transferring its energy to the plasma by classical collisions with the electrons and ions of the plasma.

6. The method recited in claim 5 wherein step (b) includes:
   directing the beam into the magnetic field along a trajectory generally parallel to the lines of force of the magnetic field.

7. The method recited in claim 5 wherein step (c) includes:
   injecting a puff of gas into the vacuum chamber.

8. The method recited in claim 5 including the step of:
   (d) inactivating external means for driving a current in the plasma subsequent to step (c) so that the entire plasma current is carried by the ion beam.

* * * * *